United States Patent [19]

Miller

[11] 3,712,496
[45] Jan. 23, 1973

[54] PUSH-OFF DEVICE FOR HAND TRUCK

[76] Inventor: Terry G. Miller, 1469 Campbell Road, No. 40, Houston, Tex. 77055

[22] Filed: April 14, 1971

[21] Appl. No.: 133,896

[52] U.S. Cl. .............214/511, 214/370, 280/42.27
[51] Int. Cl. .............................................B62b 1/09
[58] Field of Search .....214/511, 514, 82; 280/47.29, 280/47.27

[56] References Cited

UNITED STATES PATENTS

| 2,978,127 | 4/1961 | Gorman | 214/511 X |
| 3,486,651 | 12/1969 | Gottinger | 214/511 |
| 1,462,233 | 7/1923 | Kerr | 214/511 |
| 3,403,800 | 10/1968 | Botello | 214/511 |

Primary Examiner—Albert J. Makay
Attorney—Walter Leuca

[57] ABSTRACT

A push-off mechanism for attachment to any size hand truck comprising individual pivot support members removably connected by means of clamps to the side members of the hand truck. Lever bars removably mounted on the pivot support members on the straddle side of the side member of the hand truck. The bottom end of each lever bars provided with longitudinally extendable members, the distal ends of which have means for supporting a laterally extending shaft which serves as the kick-off member. The top end of the lever bars have means for connecting a laterally extending shaft for manually pivoting the lever bars.

1 Claim, 3 Drawing Figures

PATENTED JAN 23 1973

3,712,496

INVENTOR.
TERRY G. MILLER
BY Walter Leuca
ATTORNEY

PUSH-OFF DEVICE FOR HAND TRUCK

BACKGROUND OF THE INVENTION

1. Field of the Invention

The present invention relates generally to hand trucks and more particularly to a push-off attachment therefor.

2. Description of the Prior Art

Hand trucks are designed and manufactured in their conventional form for the reason that their ultimate uses are so varied that it is not possible to predict the type of articles to be transported thereby nor the mode of operation and manner of handling the articles thereon. I am not aware of more than a few hand trucks in prevalent and popular use which were designed and manufactured for the different articles to be trucked. Consequently, to facilitate the operation of a hand truck by attaching a push-off device, such push-off device will be designed for the hand truck to which it will be attached and such push-off mechanism of the prior art will not be adaptable to any other type hand truck, albeit of slight modification.

SUMMARY OF THE INVENTION

I have invented a push-off mechanism for a hand truck having component parts, and an arrangement thereof, to allow attachment to many sizes and types of hand trucks without the necessity of additional fabrication adaptation of parts Accordingly, a principle objective of my invention is to provide parts of a push-off mechanism for hand trucks which may be universally applied to any hand truck.

I accomplish this objective by providing pivot support members to be individually strapped to the side members of the hand truck, lever bars which are formed to be longitudinally adjustable at the lower ends, and which are supported by the pivot support members for pivotal movement on the straddle side of the side members of the hand truck, push-off shaft laterally connecting the lever bars at their lower adjustable end and a shaft laterally connecting the lever bars at the top ends thereof to be engaged by the operator's hand or foot to cause the pivoting of the lever bars and effect the push-off action.

Other objects and advantages will become obvious from a study of the details of construction and operation as more fully hereinafter described and claimed, reference being had to the accompanying drawings forming a part thereof, which illustrate a preferred embodiment of the present invention and in which:

DESCRIPTION OF THE PREFERRED EMBODIMENT

Figure 1:
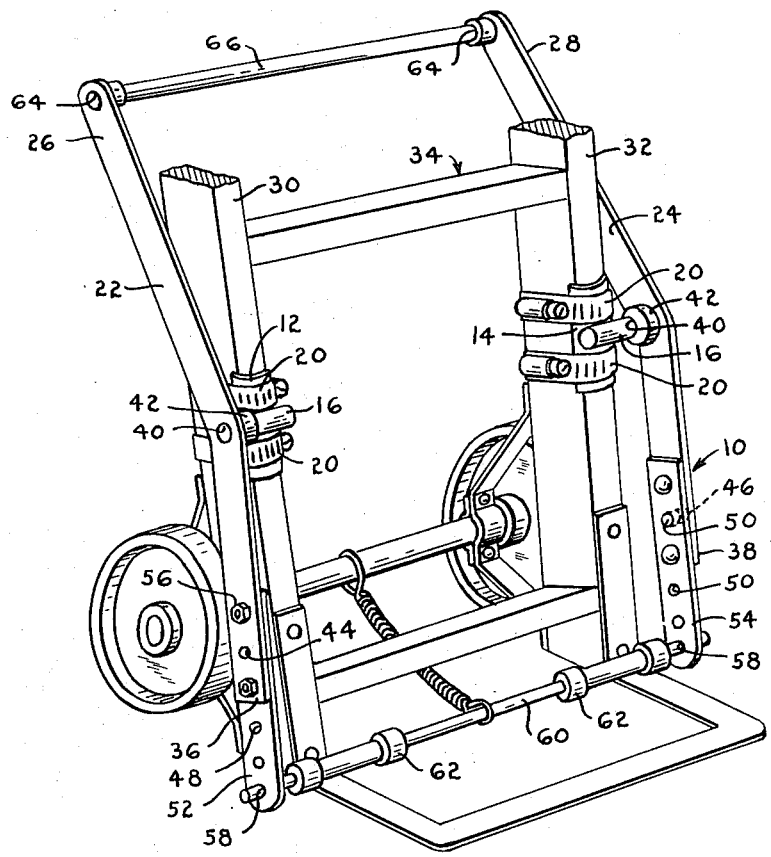
FIG. 1 is a perspective view of the component part of my invention assembled onto a hand truck, shown broken in part, to form the push-off device.
Figure 2:
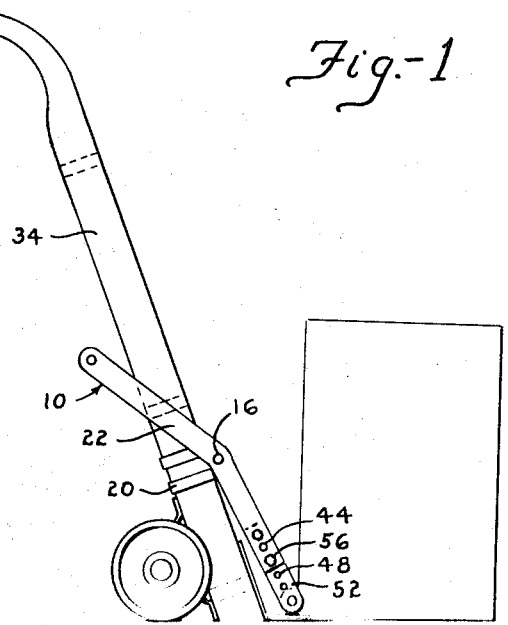
FIG. 2 is a side view of the push-off device my invention shown in operative relation with the hand truck.
Figure 3:
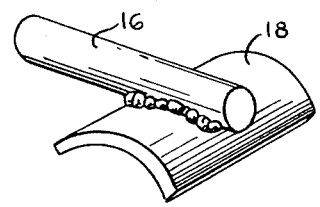
FIG. 3 is a detail perspective view of the pivot support member.

Referring now to the drawings, wherein like numerals refer to like parts, reference numeral 10 designates generally the assembled push-off mechanism of my invention. My invention comprises pivot support members 12 and 14, each of which, as best shown in FIG. 3, is formed by fixing a pin 16 to the convex side of a curved plate 18. Pin 16 is fixed on curved plat 18 by means of weldment, for example and positioned so that their respective axis are perpendicular to the longitudinal axis of curve plate 18. One pin end of pin 16 overhangs the side edge of curved plate 18. Pin 16 is positioned at the mid-portion thereof so that the curve plate portion at both ends will seat the bands of clamps 20 I next provide lever bars 22 and 24 for mounting on said pivot support members 12 and 14 respectively. Lever bar 22 and 24 are longitudinally formed so that upper ends 26 and 28 respectively, extend rearwardly of side members 30 and 32 of hand truck 34, and lower ends 36 and 38 of said lever bars 22 and 24, respectively, extend forwardly of said side members of hand truck 34. Holes 40 are provided in lever bars 22 and 24, and fixed preferably to the inner sides thereof are collar means 42, the bores of which are aligned with holes 40 of lever bars 22 and 24. The lower ends 36 and 38 of lever bars 22 and 24 are provided with a plurality of holes 44 and 46, respectively, which are selectively aligned with a plurality of holes 48 and 50 in lever bar extension members 52 and 54 Lever bar extension members 52 and 54 are connected to lever bars 22 and 24 by means of bolts 56. Axle holes 58 are provided in the distal ends of lever bar extension members 52 and 54 to rotatively receive push-off shaft 60. Roller means 62 are provided on shaft 60 to reduce the sliding friction as it is forced against the article being trucked. Axle holes 64 are provided in the upper ends 26 and 28 of lever bars 22 and 24 for receiving the ends of hand or foot shaft 66.

In the operation of my invention, the individual pivot support members 12 and 14 are mounted on side members 30 and 32 of hand truck 34 and positioned thereon so that pins 16 of each pivot support member 12 and 14 are axially aligned. Pivot support members 12 and 14 are releasably connected to the side members of hand truck 34 by means of clamps 20. Pivot support members 12 and 14 are also positioned on side members of truck 34 so that the overhanging portion of pins 16 overhang the outside of side members 30 and 32 thereof. Lever bars 22 and 24 are pivotally mounted on pin 16 by inserting the end of pin 16 in holes 40 of collar means 42 and lever bars 22 and 24. Lever bars extension members 52 and 54 are connected to lever bars 22 and 24 at lower ends 36 and 38 by means of bolts 56. Holes 44, 48 and 46, 50 in the respective bar members are aligned to provide the proper vertical adjustment for lever bar extension members 52 and 54. The ends of push-off shaft 60 are inserted in axle holes 58 in the distal end of lever bar extension members 52 and 54. Likewise, the ends of hand or foot lever shaft 66 are inserted in the holes 64 provided therefore in the top ends 26 and 28 of lever bars 22 and 24.

It is obvious from the above description taken together with the drawing that the component parts of the push-off mechanism 10 of my invention are connected to hand truck 34 in such a way that the width and length of the hand trucks may vary considerably and my push-off mechanism 10 may be assembled thereto without modification to fit different size and different style hand trucks.

I claim:
1. Component parts of a push-off device for a hand truck including:
pivot support members,
each of said support members comprising a plate member formed to seat on the side member of said hand truck,
a pin fixed to said plate member to horizontally overhang said plate member, and
means for releasably connecting each of said plate member to a side member of said hand truck; a pair of lever bars,
each thereof having a plurality of holes in one end thereof, a hole in the other end thereof, and a hole intermediate the ends thereof,
said bore intermediate the ends thereof having a diametral dimension to rotatably engage said pin of said pivot support member;
a pair of lever bar extensions having plurality of holes substantially the length thereof, and a bore in the distal end of said lever bar extensions;
releasable means for connecting said lever bar extensions and said lever bars through said plurality of holes in said lever bars and said lever bar extensions;
a shaft member laterally extending between said lever bar extensions and supported in said bores; and
a second shaft member laterally extending between said lever bars and supported in said holes in the other end of said lever bars.

* * * * *

UNITED STATES PATENT OFFICE
CERTIFICATE OF CORRECTION

Patent No. 3,712,496                Dated    Jan. 23, 1973

Inventor(s)  Terry G. Miller

It is certified that error appears in the above-identified patent and that said Letters Patent are hereby corrected as shown below:

In claim 1, column 3, line 11, the letter "a" should be deleted; line 12, the letter --a-- should be inserted before "pair"; line 16, "bore" should be changed to --hole--; and line 12 should be indented as a main paragraph. Column 4, line 3, before "plurality" insert --a--, and after "holes" add --spaced--; in line 4, change "bore" to --hole--; in line 11, change "bore" to --hole--; and lines 10 and 13 should be indented as main paragraphs. Claim 1 as corrected should read as follows:

1. Component parts of a push-off device for a hand truck including:
pivot support members,
    each of said support members comprising a plate member
        formed to seat on the side member of said hand truck,
    a pin fixed to said plate member to horizontally overhang
        said plate member, and
    means for releasably connecting each of said plate member
        to a side member of said hand truck;
a pair of lever bars,
    each thereof having a plurality of holes in one end thereof, a hole
        in the other end thereof, and a hole intermediate the ends
        thereof,
    said hole intermediate the ends thereof having a diametral
        dimension to rotatably engage said pin of said pivot
        support member;

PAGE 2--

UNITED STATES PATENT OFFICE
CERTIFICATE OF CORRECTION

Patent No. 3,712,496              Dated Jan. 23, 1973

Inventor(s) Terry G. Miller

It is certified that error appears in the above-identified patent and that said Letters Patent are hereby corrected as shown below:

a pair of lever bar extensions having a plurality of holes spaced
   substantially the length thereof, and a hole in the distal end
   of said lever bar extensions;
releasable means for connecting said lever bar extensions and said
   lever bars through said plurality of holes in said lever bars
   and said lever bar extensions;
a shaft member laterally extending between said lever bar extensions
   and supported in said holes; and
a second shaft member laterally extending between said lever bars
   and supported in said holes in the other end of said lever bars.

Signed and sealed this 20th day of November 1973.

(SEAL)
Attest:

EDWARD M. FLETCHER, JR.                RENE D. TEGTMEYER
Attesting Officer                      Acting Commissioner of Patents

UNITED STATES PATENT OFFICE
CERTIFICATE OF CORRECTION

Patent No. 3,712,496       Dated January 23, 1973

Inventor(s) Terry G. Miller

It is certified that error appears in the above-identified patent and that said Letters Patent are hereby corrected as shown below:

Column 4, after "claim 1" insert claim 2 as follows:

-- 2. Component parts of a push-off device for a hand truck including: pivot support members, each of said support members comprising a plate member formed to seat on the side member of said hand truck, a pivot joint fixed to said plate member, and means for releasably connecting each of said plate members to a side member of said hand truck; a pair of lever bars, each thereof having a plurality of holes in one end thereof and a hole in the other end thereof, and means intermediate the ends thereof to engage said pivot joint of said plate member; a pair of lever bar extensions having plurality of holes spaced substantially the length thereof, and a hole in the distal end of said lever bar extensions; releasable means for connecting said lever bar extensions and said lever bars through said plurality of holes in said lever bars and said lever bar extensions; a shaft member laterally extending between said lever bar extension and supported in said bores; and a second shaft member laterally extending between said lever bars and supported in said holes in the other end of said lever bars. --

Signed and sealed this 7th day of January 1975.

(SEAL)
Attest:

McCOY M. GIBSON JR.       C. MARSHALL DANN
Attesting Officer       Commissioner of Patents